United States Patent [19]

Dillenbeck

[11] 4,100,963
[45] Jul. 18, 1978

[54] HEAT EXCHANGE SYSTEM

[76] Inventor: Warren H. Dillenbeck, 1100 Edgedale Dr., Salisbury, N.C. 28144

[21] Appl. No.: 642,751

[22] Filed: Dec. 22, 1975

Related U.S. Application Data

[63] Continuation-in-part of Ser. No. 524,546, Nov. 18, 1974, abandoned.

[51] Int. Cl.² ............... F24D 11/00; F24D 15/00; F28D 7/08; F28D 15/00
[52] U.S. Cl. .................... 165/17; 165/32; 165/59; 165/66; 165/96; 165/105; 165/DIG. 12
[58] Field of Search .......... 165/32, 59, 66, 96, 165/105, 17, DIG. 12

[56] References Cited

U.S. PATENT DOCUMENTS

| 3,621,906 | 11/1971 | Leffert | 165/32 |
| 3,623,549 | 11/1971 | Smith, Jr. | 165/66 X |
| 3,640,090 | 2/1972 | Ares | 165/105 X |
| 3,788,388 | 1/1974 | Barkmann | 165/32 |
| 3,924,674 | 12/1975 | Basiulis | 165/32 |
| 3,934,643 | 1/1976 | Lang | 165/32 |
| 3,955,618 | 5/1976 | Asselman et al. | 165/105 |
| 3,962,529 | 6/1976 | Kubo | 165/105 X |
| 3,968,833 | 7/1976 | Strindehag et al. | 165/66 |

FOREIGN PATENT DOCUMENTS

| 929,503 | 12/1947 | France | 165/107 |
| 739,991 | 8/1943 | Fed. Rep. of Germany | 165/105 |

Primary Examiner—Charles J. Myhre
Assistant Examiner—Sheldon Richter

[57] ABSTRACT

A plurality of parallel heat exchange tubes are grouped together and connected at the ends to form a bank. One or more banks are positioned so that one end lies in a supply air stream and the other end lies in an exhaust air stream. Each bank of tubes is sealed and contains a working fluid of the type having a liquid phase and a vapor phase. At one end of each tube, the working fluid absorbs heat from one of said air streams to effect vaporization of said fluid, the vaporized fluid flows to the cooler end of said tube where said vaporized fluid gives up heat to the cooler air stream and condenses in the tube. The condensed fluid then flows back to the warmer end by means of gravity.

One end of the lowest tube in each bank includes a reservoir connected thereto which communicates with the normally cooler air path and includes a heating coil operatively associated therewith for providing a modulated control of the system responsive to the temperature of the enclosed space being ventilated. Additionally, a second control system turns selected banks of heat tubes on and off to prevent frost from forming thereon.

18 Claims, 5 Drawing Figures

HEAT EXCHANGE SYSTEM

REFERENCE TO RELATED APPLICATIONS

This application is a continuation-in-part of my copending application Ser. No. 524,546 filed Nov. 18, 1974, now abandoned.

BACKGROUND OF THE INVENTION

Ventilating systems for enclosed spaces in which a heat exchanger is placed between the supply air stream and the exhaust air stream to take advantage of the temperature difference, for the purpose of conserving the energy required for either heating or cooling, are known. For example see U.S. Pat. Nos. 1,725,906; 2,206,858; and 2,019,351. Carrying the concept a step further, it is even known that heat pipes may be used in such heat exchange systems as described and illustrated in U.S. Pat. No. 3,788,388.

Such known systems, however present various problems. For example, most of these systems include a plurality of straight, individually sealed and charged pipes which carry a working fluid. Such a system is expensive and complicated. The problems are even further magnified if it is desired to control the rate of heat recovery in response to the temperature of the ventilated space. This is known as "modulating". Heat pipe devices normally transfer heat at a rate solely proportional to the temperature difference between warm and cold ends. Modulating this heat transfer rate has required complicated apparatus.

Further, when the supply air reaches a temperature below a prescribed point, the outgoing air stream will reach a temperature where moisture will precipitate and condense on the pipes. If the surface temperature of the pipes is below freezing, a forming and buildup of frost thereon will occur with undesirable results.

SUMMARY OF THE INVENTION

The present invention is therefore directed to a heat exchange system applicable for use with a heated and/or cooled enclosed space, hereinafter referred to as the "enclosed space," in which ventilation is also required, such as, for example commercial and industrial buildings. The system described herein includes one or more banks of heat exchange pipes, each bank including a plurality of horizontally extending, vertically spaced heat exchange pipes with one end in contact with a supply air stream and the other end in contact with an exhaust air stream. In each bank the individual pipes or pipe sections are connected by U-shaped end sections, so that the entire bank forms a continuous, sinuous passageway. The end sections of each pipe are of a smaller effective diameter than the central portions thereof, and are preferably offset upwardly from the central axis thereof, so that a weir or dam is formed to retain a specified amount of working fluid in each pipe section. This results in considerable economies in that each individual pipe does not have to be charged and maintained separately. It also permits the system to be more compatible with a control means as will be discussed hereinbelow.

The working fluid within the pipe is of a type which absorbs heat from the warmer of said air streams thus effecting vaporization of the fluid, the vaporized fluid flowing to the cooler end of the tube (due to a slight pressure differential between the warm and cold end). As the vaporized fluid gives up heat to the cooler air stream, it condenses in the tube and flows back to the warm end by gravity again to be vaporized, thus completing the cycle. This is known commonly as a "thermosiphon system". A novel control means includes a working fluid reservoir which is connected to the supply end of the lowest tube of each bank and in which the working fluid begins condensing and collecting as soon as the surface temperature of the reservoir is cooler than the working fluid in that bank.

It is known that heat pipes can be "turned off" by keeping the working fluid out of contact with the wicking portion of a heat pipe. The present invention accomplishes this by means of the selectively heated reservoir which is positioned in the supply stream, which in cold weather is the coolest point of the system. In cold weather, the working fluid naturally tends to migrate to the reservoir, deactivating the heat pipes. As long as the reservoir is heated, working fluid returns to the heat pipes, reactivating them.

In warm weather, when supply air is warmer than exhaust air, the reservoir stays empty of liquid, and the heat exchange tubes stay fully active. During this time the enclosed space must, of course, be refrigerated to benefit from this system.

During intermediate weather seasons, particularly in commercial office buildings, hospitals, and schools, the more moderate daytime temperatures combined with the heat caused by sunshine on the windows and the interior lighting create conditions in which the heat exchange system must often be operated at less than full capacity. A modulated control, where the heat exchange rate varies gradually, is preferable to a system which is either completely "on" or completely "off". The present invention accomplishes such a modulated control simply, with a minimum of expense, and without moving parts as in other known systems. Merely turning the reservoir heating coil on or off causes the system to gradually increase or decrease in efficiency in a surprisingly simple and economic manner.

To remove the frost mentioned hereinabove, which accumulates in cold weather on the last few rows or banks of the exhaust air stream, these rows are warmed up at regular intervals, or responsive to prescribed conditions, and the frost melted. Toward this end, such rows of the system are merely deactivated for a brief prescribed period during which very little heat is transferred, so that the overall heat recovery effectiveness of the unit drops causing the temperature on the exhaust side of the rows with frost thereon to rise. The frost will begin to melt. As soon as the frost is melted or after a prescribed time period, the deactivated rows are reactivated and the unit resumes full recovery.

It is therefore an object of the present invention to provide a heat exchange system which utilizes heat exchange tubes arranged in a new and novel way.

It is further an object of the present invention to provide a system of the type described wherein the liquid level of the working fluid in each horizontal tube of the system may be controlled.

It is yet a further object of the present invention to provide a heat exchange system of the type described wherein the operation of the system may be controlled responsive to the temperature in a space served by the supply air stream.

Another object of the invention is to provide a heat recovery system which may be modulated during cool weather to operate at less than full efficiency in a simple, economic, and novel manner.

Still another object of the present invention is to provide a heat exchange system of the type described which includes an auxiliary frost control system for operating one or more banks of heat exchange tubes responsive to the development of frost forming conditions.

Other objects and a fuller understanding of the present invention will become apparent from reading the detailed description of the preferred embodiment along with the accompanying drawings in which.

Figure 1:
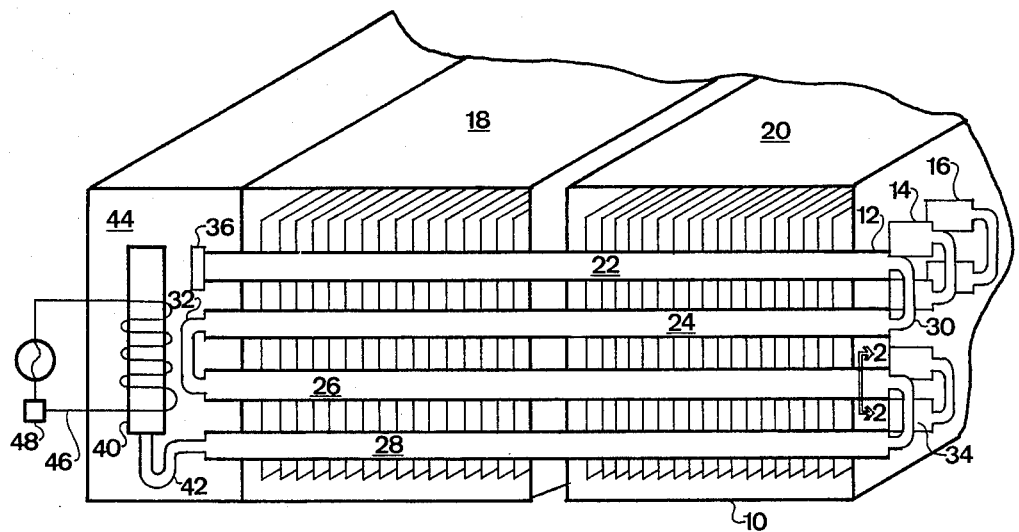
FIG. 1 is a perspective view of the heat exchange unit with certain parts broken away for the sake of clarity.
Figure 2:
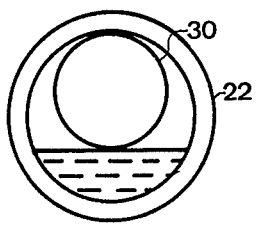
FIG. 2 is a sectional view taken substantially along lines 2—2 in FIG. 1, and illustrating a cross section of one of the heat exchange tubes.

Referring now to the drawings, and particularly to FIGS. 1 and 2, there is shown a heat exchange system or apparatus 10 which includes a plurality of banks 12, 14 and 16 of heat exchange tubes extending between a supply air conduit 18 and an exhaust air conduit 20. Each bank 12, 14 and 16 as illustrated in FIG. 1, includes a plurality of vertically spaced, horizontally extending, linear sections or tubes 22, 24, 26, 28 in heat exchange relationship with fins 29 which extend transversely to the tubes. It should be recognized that the banks may be arranged either in a vertical plane, or the top or bottom may be tilted upstream or downstream as much as 80° from vertical for convenience in duct installation, which change will have no effect on the operation thereof.

One end of the upper linear section 22 is connected to the corresponding end of the next lowest linear section 24 by a U-shaped end section 30. The opposite end of linear section 24 is connected to the corresponding end of linear section 26 by a second U-shaped end section 32. Section 34 similarly connects the other end of linear section 26 with the corresponding end of section 28. A cap 36 seals the free end of the uppermost linear section 22.

As illustrated by FIGS. 1 and 2, the diameter of end sections 30, 32 and 34 is smaller than the corresponding diameter of linear sections 22, 24, 26, 28. Additionally, at least at the exit end of the linear sections, the connectors join the tubes at a point slightly above the axis of the linear tube sections. The "exit end" of the linear sections are the ends adjacent the upper end of the U-shaped connector through which working fluid passes on its way to the next lowest linear section. A series of weirs or dams is thus provided at the ends of the linear sections, so that the level of the working fluid may be controlled. It is preferable, as illustrated in FIG. 2, that the liquid level be maintained at approximately 1/3 the total capacity of each linear section. Obviously, other systems of weirs or dams could be used, at differing levels, depending on the amount of working fluid desired to be maintained in each tube section. Thus, the ends of each pipe are of a smaller diameter than the central portions thereof and at least at the exit end thereof are offset axially thereabove, so that a weir is formed to maintain a specified amount of working fluid in each pipe, while the overflow is conducted to the next lower tube section. Such an arrangement results in considerable economies in that each individual pipe does not have to be charged and maintained. It also permits the system to be more adaptable to a control means such as will be discussed hereinbelow.

At the end of the lowermost linear section 28, opposite the end to which connector 34 is coupled, a reservoir 40 of such capacity as to contain all of the working fluid in bank 12 is connected by means of a liquid trap 42. Reservoir 40 is placed in a shunt chamber 44 adjacent supply air conduit 18 through which a small portion of the supply air stream is directed. Heater coils 46 are positioned to heat reservoir 40 and are controlled by a thermostat 48 placed in the "enclosed space".

Whenever supply air is cooler than exhaust air, the reservoir for the working fluid is in the cooler air stream, and the working fluid will tend to migrate into the reservoir. Without heating of the reservoir, it cannot escape back into the system. Thus the system may be completely deactivated after heater coils 46 are deactivated for a period of time.

When the thermostat 48 in the enclosed space calls for heating, as is normal in cool weather operation, heaters 46 on the reservoirs are activated. The working fluid will gradually begin to vaporize, increasing the pressure within the reservoir above that within the heat tubes, forcing the liquid into the lowest heat tube where it vaporizes and redistributes to all tubes. As long as heaters 46 are activated this thermosiphonic condition is either at or building toward peak efficiency. When the thermostat 48 within the "enclosed space" is satisfied, heaters 46 are deactivated and the vaporized working fluid will begin collecting in the reservoir, thus slowly decreasing the efficiency of the system. As the temperature in the served space again falls below the "set point", heater 46 will again be activated to increase efficiency. The working fluid collected in the reservoir will begin working its way back into the system along the sinuous path of the bank of heat tubes.

In reality, during cool or intermediate seasonal operation, the system will not operate at either full or minimal efficiency, but will fluctuate so that the temperature within the served space will average at the "set point" (thermostat setting). Heat exchange tubes will be neither completely full nor completely empty. This is known as "modulated control" in which heat transfer effectiveness reaches equilibrium at a point just sufficient to satisfy the temperature requirement in the served space. The present system is able to thus modulate the system through varying rates of efficiency, rather than by an on-off system control. Such modulation by other known means are more complicated and expensive, and generally require moving parts. It should be recognized that preferably each bank of heat tubes will be provided with its own reservoir and heater, so that each bank may be individually controlled, and while some banks are operating, others may be deactivated for frost control as discussed hereinbelow.

The working fluid may be selected from any of several types, such as, for example, fluorinated hydrocarbons, water, glycol, Dowtherm (trademark of Dow Chemical). Also, it is preferable that the inner walls of each heat exchange tube be provided with small, peripherally extending circular or spiral grooves, not to act as a longitudinal wick for the working fluid, but rather to spread the working fluid entirely around the wall at the hot end of the heat exchange tube to facilitate vaporization, and to provide a larger surface area at the cool end on which the vaporized working fluid may condense and drain down the inner wall to the fluid therebelow. Although not described specifically, the banks 14, 16 of heat tubes are arranged and operate similarly to the manner described for bank 12.

Figure 3:
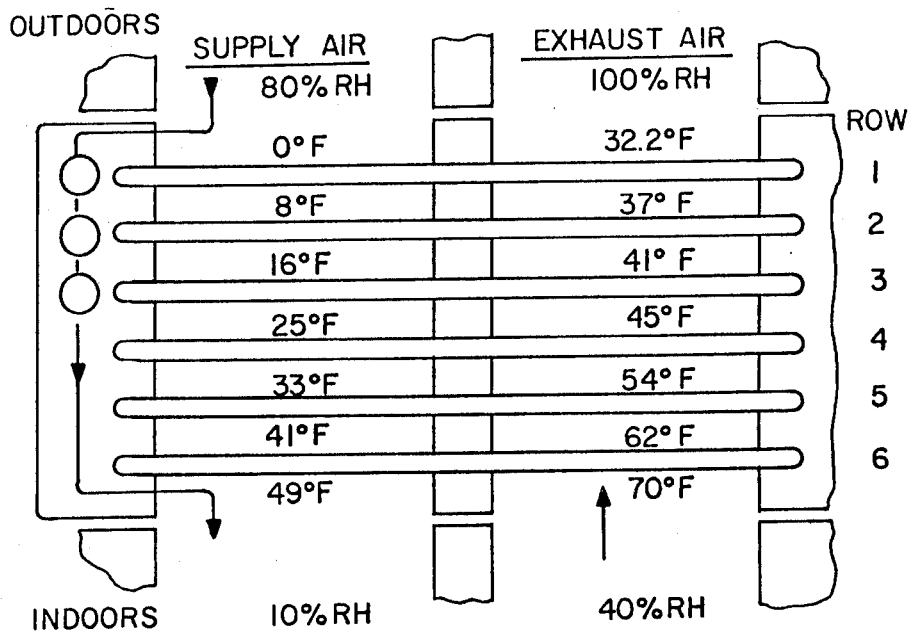
FIG. 3 is a schematic representation of a heat exchange system without the frost control unit, illustrating how frost can build up on the heat exchange tubes in the exhaust path.
Figure 4:
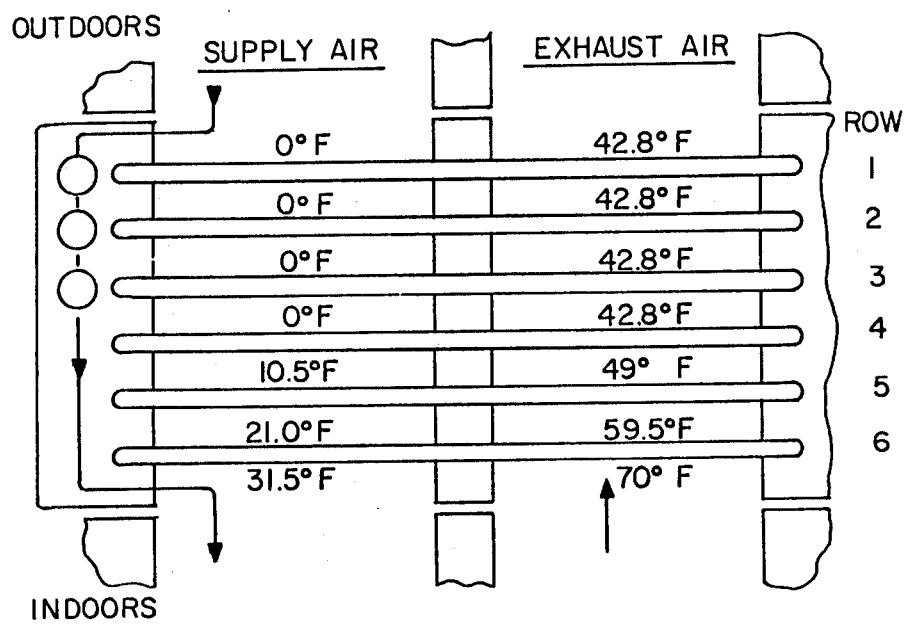
FIG. 4 is a schematic representation similar to FIG. 3, except showing the resulting system after the frost control circuit is activated.

Turning now to FIGS. 3 and 4, there is provided a frost control system, which may best be understood by considering the temperature and humidity of air as it flows through the heat exchange system in cold weather. For example, FIG. 3 shows a unit operating wherein the supply is at 0° F. and 80% relative humidity. For purposes of this discussion it is assumed that a heat recovery effectiveness of 70% is achieved.

It is well known that warm air can hold much more moisture than cold air. For example, at 70° F., saturated air (100% relative humidity) contains about 0.016 pounds water per pound of air, while at 0° F., saturated air contains less than 0.001 pounds water per pound air. Thus, air is cooled, its relative humidity increases, because the amount of water in the air remains constant while the amount it could possibly hold decreases.

Turning now to specifics, the exhaust air leaving the enclosure at 70° F., 40% relative humidity, reaches 100% relative humidity when it is cooled to 45° F. If that air is cooled further, it becomes supersaturated, and moisture will precipitate therefrom. In the example of FIG. 3, moisture is precipitated on the three banks of heat exchange tubes nearest the outside in the exhaust air stream, since the air at those tubes is chilled to less than 45° F. Thus moisture is condensed on the surfaces of the fins and tubes it passes over in this area. On the other side or in the supply air stream, as the cold air is warmed, it decreases in relative humidity because its absolute water content is unchanged while its moisture capacity at saturation increases. Therefore the relative humidity of the supply air stream decreases from 80% to 10%, even though no moisture is added or lost on the supply air stream side.

FIG. 3 illustrates the approximate air temperatures which will exist between each row or bank of tubes during operation at certain typical conditions. The surface temperature of the tubes in a given row will, because of the extremely effective heat transfer of the heat exchange tube, be nearly uniform throughout its length. The surface will reach equilibrium at a mean value between the air temperatures it is exposed to. Thus, row number 1, which is the upper row in FIG. 3, will reach a mean surface temperature of $(0+8+32.2+37)/4=19.3°$ F. Similarly the surface temperature of rows 2 and 3 will be 25.5° and 31.5° F. respectively.

As mentioned hereinabove, when the temperature of the exhaust air stream falls below 45° F., moisture will begin to condense on the heat exchange tube surface. In observing FIG. 3, it will be noticed that this will occur on rows 1, 2 and 3 on the exhaust side of the unit. Since these tubes are at a mean surface temperature of less than 32° F., the condensate will freeze, or precipitate as frost, rather than water. The frost will adhere to the tubes and gradually build up in thickness, increasing the air pressure drop through the coil and degrading its heat exchange performance, since frost has considerable thermal resistance.

In order to remove the frost which accumulates on rows 1, 2 and 3, it is necessary to warm up those rows at periodic intervals, or stated otherwise, melt the frost which will quickly drain off. To accomplish this end, rows 1, 2 and 3 are deactivated for a brief period, as explained hereinabove by turning off heaters 46 associated with these rows and by drawing off the working fluid from the heat pipes into the reservoirs 40.

With rows 1, 2 and 3 deactivated, very little heat is transferred in those rows, so that the overall heat recovery effectiveness of the unit drops to about 45%. The resulting temperature levels re shown in FIG. 4. It can be seen that 42.8° F. air will flow across rows 1, 2 and 3 on the exhaust side, which is warm enough to melt the frost on those rows. As soon as the frost is melted, the deactivated rows are reactivated by turning on the heaters for the respective reservoirs, so that the unit will resume heat recovery.

Figure 5:
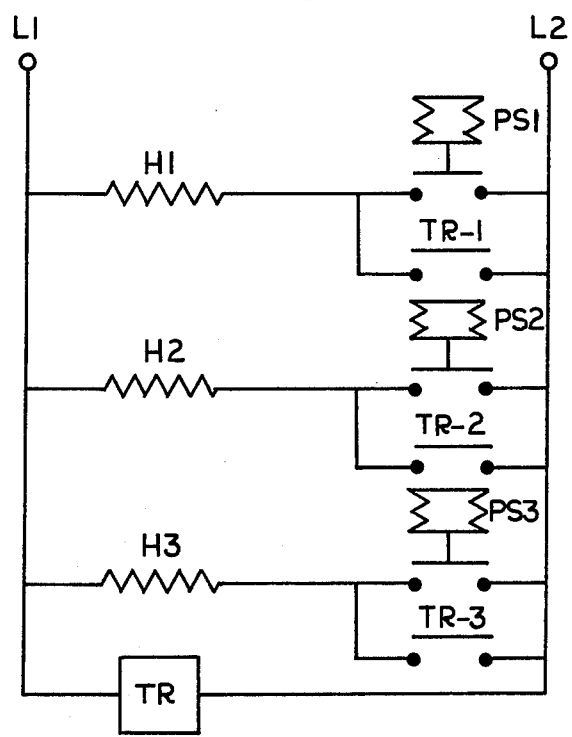
FIG. 5 is an electrical schematic illustrating the defrost control for the heat recovery coils.

There are several possibilities for controlling the deactivation of selected rows. For example, the heat pipe fluid vapor pressure may be sensed by a sensor in each bank. For a given working fluid, there is a fixed working relationship between vapor pressure and temperature. Thus, when the vapor pressure corresponds to a temperature below 32° F., a pressure switch PS1, PS2, or PS3 (FIG. 5) is activated. During the time when one of pressure switches PS1, PS2, or PS3 is closed, a time delay relay TR will periodically close the corresponding set of contacts TR1, TR2, or TR3. Since contacts TR1, TR2, and TR3 are arranged in parallel with pressure switches PS1, PS2, and PS3 respectively, the closing of both switches for one bank will deactivate the corresponding heater coil H1, H2, or H3. These heaters correspond to heater 46 in FIG. 1, and control the working fluid. Time delay relay TR controls the defrost cycles for all rows, whereby if more than one row is calling for defrost, all rows are defrosted at the same time. A circuit to accomplish this possibility is illustrated in FIG. 5. A typical timing cycle for a time delay relay TR might be two hours closed, five minutes open.

Secondly, it is possible to sense the air pressure drop across the bank of heat exchange tubes in the exhaust stream. If the pressure drop increases above a preselected level, indicating frost buildup, the first bank or banks (nearest the outdoor side), are deactivated for a given length of time, or until the pressure drop returns to a lower selected level. Deactivation can be accomplished by opening a circuit to the electric heaters 46 on reservoirs 40, which permits cold outdoor air to cool the reservoir to the point that it collects the working fluid.

It is also possible to sense the heat pipe fluid temperature or the surface temperature instead of pressure drop and activate and deactivate the heating coil in response thereto as a further means for controlling the defrost cycle.

In the drawings, six banks of heat tubes are provided, however this number can be altered as desired. Also it should be understood that although a preferred embodiment of the invention has been described in detail, other changes, alterations, and modifications might be made without departing from the spirit and scope of the invention, which is defined by the following claims.

What is claimed is:

1. In combination with a heat exchange tube of the type having one end in communication with a cooler medium, the other end in communication with a warmer medium, and a working fluid therein with a liquid phase and a vapor phase within the operating temperature range of said tube, an improved control device comprising a reservoir for said working fluid operatively connected to said one end and a heating means operatively associated with said reservoir, said heating means being turned on and off responsive to prescribed temperature conditions, whereby the thermosiphon effect of said heat exchange tube may be modulated by the activation and deactivation of said heating means.

2. In combination with a heat exchange system of the type having one or more rows of heat exchange tubes containing a working fluid of the type having a liquid phase and a vapor phase within system operating temperatures, and wherein said rows of tubes have one end thereof in communication with a cool air stream and the other end thereof in communication with a warm air stream, an improved control device comprising a reservoir in communication with the interior of and connected to at least one of said tubes and positioned in said cool air stream, a heating means in operative communication with said reservoir and a switch means connected thereto, said switch means operable in response to temperature conditions of a served space around a set point to selectively activate and deactivate said heating coil, whereby said heat exchange tubes are operable only while the temperature of said served space is below said set point and heating is required in said space and upon deactivation of said heating coil said working fluid gradually collects in said reservoir.

3. In a heat exchange system of the type including a plurality of rows of heat exchange tubes containing a working fluid of the type having a liquid phase and a vapor phase within system operating temperatures, and wherein said heat exchange tubes have one end thereof in communication with a supply air stream and the other end thereof in operative communication with an exhaust air stream, the improvement comprising a control means for activating and deactivating said heat exchange tubes, said control means being operated in response to the buildup of frost on certain of said heat exchange tubes to selectively deactivate at least one selected row of tubes in said system.

4. The improvement according to claim 3 wherein said control means includes a pressure switch in communication with the working fluid in each of said rows of heat tubes, said pressure switch deactivating the corresponding row periodically when the pressure of said working fluid falls to a prescribed level.

5. The improvement according to claim 3 wherein said control means comprises a pressure switch in operative communication with said exhaust air stream, said pressure switch being activated to deactivate selected rows of heat tubes in response to a pressure drop of a prescribed level in said exhaust air stream.

6. A heat exchange tube system comprising at least one bank of horizontally extending tube sections arranged one above the other, one end of said bank of tube sections positioned in a cooler air stream and the other end positioned in a warmer air stream, means for connecting corresponding ends of said tube section to form a continuous, sinuous path therethrough; means for sealing the free ends of said upper and lower tube sections, a working fluid in said tubes having a liquid phase and a vapor phase within the operating temperature range of said system, and means for maintaining said working fluid at a prescribed level in each tube section.

7. The system according to claim 6 wherein said last mentioned means comprises a weir at the end of each tube section, said weir being of such size and shape as to retain a prescribed amount of working fluid in each of said tube sections.

8. The system according to claim 6 wherein the means for connecting corresponding ends of said tube sections includes U-shaped end sections, each end section having one end thereof connected to one end of said tube sections and the other end thereof connected to the corresponding end of an adjacent tube section.

9. The system according to claim 8 wherein said U-shaped end sections are of a smaller diameter than said tube sections.

10. The system according to claim 9 wherein said U-shaped end sections are so secured to said tube sections that the axis of said end sections are at a point above the longitudinal axis of said tube section.

11. Heat exchange system for transferring heat between a supply air stream and an exhaust air stream serving an enclosed space comprising:
   (a) one or more rows of heat exchange tubes, one end of said rows positioned in said supply air stream and the other end of said rows positioned in said exhaust air stream, each of said rows comprising:
      (i) a plurality of horizontally extending tube sections arranged one above the other;
      (ii) means for connecting corresponding ends of said tube sections to form a continuous, sinuous path therethrough;
      (iii) a reservoir connected to one end of the lowermost of said sections and positioned in communication with the normally cooler of said air streams;
      (iv) means for closing the free end of the uppermost of said tube sections;
      (v) working fluid in each row of heat exchange tubes, said working fluid having a liquid phase and a vapor phase within the range of system operating temperatures whereby heat is absorbed from one of said air streams which effects vaporization of said fluid, said vaporized fluid being transferred to the cooler end of said tube, said vaporized fluid giving up heat to the cooler of said air streams, and condensing in said tube, said condensed fluid flowing back to the warmer end by gravity;
      (vi) means for maintaining said working fluid at a prescribed level in each tube section; and
   (b) control means connected to said reservoir for operating said system responsive to prescribed conditions of such system.

12. The system according to claim 11 wherein the means for connecting corresponding ends of said tube sections includes U-shaped end sections, each end section having one end thereof connected to one end of one of said tube sections and the other end thereof connected to the corresponding end of an adjacent tube section.

13. The system according to claim 12 wherein said U-shaped end sections are of a smaller diameter than said tube sections.

14. The system according to claim 13 wherein said U-shaped end sections are so secured to the exit end of said tube sections that the axis of said end sections are at a point above the longitudinal axis of said tube section.

15. The system according to claim 11 wherein said control means includes a means for modulating the amount of working fluid available in the straight tube sections of said heat exchange tubes.

16. The system according to claim 15 wherein said modulating means includes a heating means operatively connected to each of said reservoirs.

17. The system according to claim 16 wherein said heating means includes a heater coil in operative communication with each of said reservoirs, said heater coils being deactivated when the air temperature in said space rises to a prescribed level.

18. The system according to claim 17 wherein selected of said reservoirs are also deactivated responsive to the buildup of frost on the heat transfer surface of said tubes.

* * * * *